(12) United States Patent
Abbasi

(10) Patent No.: US 11,383,204 B1
(45) Date of Patent: Jul. 12, 2022

(54) METHOD FOR PRODUCTION OF LEAD-212 ISOTOPE

(71) Applicants: Ali A Abbasi, New York, NY (US); Potentgen Nükleer Tip Biyoteknoloji Klinik Araştirma Ve Danişmanlik Anonim Şirket, Atasehir/Istanbul (TR)

(72) Inventor: Ali A Abbasi, New York, NY (US)

(73) Assignees: Potentgen Nükleer Tip Biyoteknoloji Klinik Araştirma ve Danişmanlik Anonim Şirket, Atasehir/Istanbul (TR); Ali A. Abbasi, New York, NY (US)

( * ) Notice: Subject to any disclaimer, the term of this patent is extended or adjusted under 35 U.S.C. 154(b) by 0 days.

(21) Appl. No.: 17/506,379

(22) Filed: Oct. 20, 2021

Related U.S. Application Data

(60) Provisional application No. 63/241,610, filed on Sep. 8, 2021.

(51) Int. Cl.
 *B01D 59/00* (2006.01)
 *B01D 59/24* (2006.01)

(52) U.S. Cl.
 CPC .................. *B01D 59/24* (2013.01)

(58) Field of Classification Search
 CPC ........ B01D 59/10; B01D 59/22; B01D 59/24; B01D 59/50; C22B 13/04
 See application file for complete search history.

(56) References Cited

U.S. PATENT DOCUMENTS

| 4,663,129 A | 5/1987 | Atcher et al. |
| 5,038,046 A | 8/1991 | Norman et al. |
| 2018/0047474 A1 | 2/2018 | O'Hara |

FOREIGN PATENT DOCUMENTS

WO   2013174949 A1   11/2013

OTHER PUBLICATIONS

Mutsuaki Shinagawa et al., On the Gaseous Electro-Deposition of Decay Products of Thorium, Journal of Nuclear Science and Technology, vol. 5, No. 8, p. 408-413 (Aug. 1968), Received Jan. 12, 1968, Revised Apr. 3, 1968.

(Continued)

*Primary Examiner* — Steven J Bos

(57) ABSTRACT

A method for producing Pb-212 isotope comprises introducing Th-228 into an emanation box. The emanation box comprises an emanation source comprising a high-surface area material. The method also includes introducing a carrier gas into the emanation box through a carrier gas feed. The method also includes separating the Rn-220 from the carrier gas in the one or more Rn-220 targets, directing the carrier gas out of the one or more Rn-220 targets through a carrier gas exhaust port, directing a liquid through a liquid feed into the one or more Rn-220 targets, and allowing the Rn-220 to undergo radioactive decay into Pb-212 isotope within the one or more Rn-220 targets. The liquid dissolves the Pb-212 isotope produced by radioactive decay of Rn-220 within the one or more Rn-220 targets. The method further includes directing the liquid containing the Pb-212 isotope from the one or more Rn-220 targets to a Pb-212 collection container, and separating the Pb-212 isotope from the liquid.

20 Claims, 8 Drawing Sheets

(56) References Cited

OTHER PUBLICATIONS

C.D. Tibambre-Heredia et al., Radon Progeny Recoil Effect in Retrospective Indoor Glass Dosimetry, Journal of Nuclear Physics, Material Sciences, Radiation and Applications, vol. 7, Issue 1, Aug. 2019, Chitkara University Publications, India. Received: Nov. 6, 2019, Revised: Jan. 7, 2020, Accepted: Feb. 8, 2020, Published online: Feb. 10, 2020.
A.D. Ryon et al., Nitric Acid Leaching of Radium and other Significant Radionuclides from Uranium Ores and Tailings, Oak Ridge National Laboratory, Chemical Technology Division, Aug. 1977, Tennessee.
Adam R. Abate et al., Air-bubble-triggered drop formation in microfluidics, School of Engineering and Applied Sciences/Department of Physics, Harvard University, Massachusetts, Lab on a Chip, DOI: 10.1039/c1lc20108e, Received Feb. 6, 2011, Accepted Mar. 17, 2011, Published Mar. 29, 2011.
J.R. Dean et al., Indirect Measurement of Thorium-228 and Radium-224 by High Resolution Alpha Spectrometry, Nuclear Instruments and Methods in Physics Research 223 (1984) 253-258, Elsevier Science Publishers B.V., North-Holland, Amsterdam.
E.A. Fisher, The Freezing of Water in Capillary Systems: A Critical Discussion, p. 360-367, Department of Textile Industries, Leeds University.
Saed Mirzadeh, Generator-produced Alpha-emitters, Appl. Radiat. Isot. vol. 49, No. 4, pp. 345-349, 1998, Nuclear Medicine Group, Life Sciences Research Division, Oak Ridge National Laboratory (ORNL), Tennessee.
A.D.R. Harrison et al., The Electrolytic Separation from Thorium Nitrate of Thorium C (212Bi) and Thorium B (212Pb) in Chloride Solution, Analytica Chimica Acta, vol. 13 (1955), p. 459-464, Department of Chemistry, Sir John Cass College, England, Received Mar. 26, 1955.
Raleigh Gilchrist, Determination of Iridium in Platinum Alloys by the Method of Fusion with Lead, Investigations on the Platinum Metals, Scientific Papers of the Bureau of Standards, vol. 19, p. 325-345, Washington, Oct. 8, 1923.
J. Nather et al., Electrochemical deposition of iridium and iridium-nickel-alloys, 19th Chemnitz Seminar on Materials Engineering—19. Werkstofftechnisches Kolloquium, IOP Conf. Series: Materials Science and Engineering 181 (2017) 012041, IOP Publishing.
E. S. Benilov et al., Steady rimming flows with surface tension, J. Fluid Mech. (2008), vol. 597, pp. 91-118, United Kingdom, Received Mar. 8, 2006 and in revised form Oct. 10, 2007.
Tomozo Sasaki et al., Mathematical Modeling of Radon Emanation, Journal of Nuclear Science and Technology, vol. 41, No. 2, p. 142-151 (Feb. 2004), Received Aug. 27, 2003 and accepted in revised form Nov. 27, 2003.
William B. Zimmerman et al., Towards energy efficient nanobubble generation with fluidic oscillation, Current Opinion in Colloid & Interface Science, 16 (2011) 350-356.
Iago Pereiro et al., Nip the bubble in the bud: a guide to avoid gas nucleation in microfluidics, Lab on a Chip, Received Feb. 28, 2019, Accepted May 10, 2019, 2019, 19, 2296-2314, Royal Society of Chemistry, Switzerland.
Elvira P. Sanjon et al., A combined experimental and theoretical study of radon solubility in fat and water, Scientific Reports, (2019) 9:10768, Received: Aug. 6, 2018, Accepted: Jul. 1, 2019, Published: Jul. 24, 2019, Springer Nature.
R. Salim et al., Absorption of Lead on Container Surfaces, J. Electroanal. Chem., 106 (1980) 251-262 ,Received Jul. 13, 1979, Netherlands.
Hirokatsu Takemi et al., Selective Gaseous Electro-Deposition of Lead-212 and Tellurium-208 from RdTh Source, Journal of Nuclear Science and Technology, vol. 10, Issue 3, p. 155-162 (Mar. 1973), Received Aug. 12, 1972.
Arthur W. Struempler, Adsorption Characteristics of Silver, Lead, Cadmium, Zinc, and Nickel on Borosilicate Class, Polyethylene, and Polypropylene Container Surfaces, Analytical Chemistry, vol. 45, No. 13, p. 2251-2254, Nov. 1973.
P.L. Evans et al., Three-dimensional solutions for coating flow on a rotating horizontal cylinder: Theory and experiment, Physics of Fluids, Jul. 2005, American Institute of Physics, Received Apr. 29, 2004; accepted Apr. 14, 2005; published online Jun. 24, 2005.
224Ra/212Pb Generator, Eichrom, AN-1620-10.
Nicholas Van Der Meulen, Ion Exchange Behaviour of 42 Selected Elements on AG MP-50 Cation Exchange Resin in Nitric Acid and Citric Acid Mixtures, A thesis submitted to the University of Stellenbosch, Jan. 2003.
P.P. Boldyrev et al., Physical and chemical processes on the 212Pb radionuclide production for nuclear medicine, IOP Conf. Series: Journal of Physics: Conf. Series 1099 (2018) Jan. 2003, IOP Publishing Ltd.
P.P Boldyrev et al., Physical and Chemical Process on the 212Pb Radionuclide Production for Nuclear Medicine, Journal of Physics: Conf. Series 1099 (2018) Jan. 2003, T(O)T11 International Symposium, Ottowa, Apr. 1-4, 2019.
Sindre Hassfjell, A 212Pb Generator based on a 228Th Source, Department of Chemistry, Nuclear Chemistry Section, University of Oslo, Applied Radiation and Isotopes 55 (2001) 433-439, Received Aug. 29, 2000; Received in Revised Form Oct. 23, 2000; Accepted Oct. 31, 2000.

US 11,383,204 B1

METHOD FOR PRODUCTION OF LEAD-212 ISOTOPE

RELATED APPLICATIONS

This application claims the benefit of U.S. Provisional Application No. 63/241,610, filed Sep. 8, 2021.

FIELD OF THE INVENTION

Generally, the present invention relates to method and apparatus for generation/production and trapping/separation of lead-212 (Pb-212) isotope.

DESCRIPTION OF RELATED ART

Alpha particle therapy provides opportunity for the treatment of many cancers. However, production of alpha particle emitting isotopes is a very complex process with many technical and regulatory obstacles. Production of alpha particle emitting isotopes is also very expensive and difficult to scale up, which so far has resulted in alpha particle therapy being nonviable for commercialization and patient use. In general, a high-energy accelerator or a reactor with a complex and cumbersome process of bombardment, irradiation and conventional chemical separation have been needed to produce an alpha emitting isotope that could be used in radiolabeled drug product for human injection. Pb-212 is an alpha emitting isotope which has a suitable energy profile and chemistry for radiolabeling. This makes Pb-212 a very promising contender for treatment of various types of cancer used in TAT (Targeted Alpha Therapy). Pb-212 isotope may be produced from mother isotope of Th-228, which is available from a reactor or nuclear waste generated in industry or government based nuclear plants.

Previous methods and systems for generating Pb-212 isotope rely on chemical separation of radium-224 (Ra-224) from Th-228 as a feed stock/parent isotope. Ra-224 has a half-life of 3.66 days. Because of Ra-224's short half-life, previous systems require frequent replenishment of the Ra-224 feed stock/isotope source in a generator form producing Pb-212 with limited activity up to 30 mCi due to Trans Index and transportation issues. Replenishment and extraction of Ra-224 from Th-228 is a reoccurring process in production of Pb-212 isotope via chemical separation methods previously used in production of Pb-212. Furthermore, the previous methods entail a high risk of radiation exposure during the purification of Ra-224 from Th-228 and loading a current Pb-212 generator with Ra-224. These methods with reoccurring extraction of Ra-224 from Th-228 and replenishment of Ra-224 into the Pb-212 generator increases risk of exposure to radiation during Ra-224 transportation, production and replacement.

This existing Ra-224/Pb-212 generator technology is only feasible for small-scale use in R&D and small-scale clinical trials. However, scaling up and commercialization of these previous methods is not feasible from a financial, regulatory, production safety and patient safety standpoint. Additionally, because previous methods rely on chemical separation of Ra-224 from Th-228 there is a risk of Th-228 and Ra-224 breakthrough into the Pb-212 final product through this chemical separation. This separation is limiting step in previously existing methods since presence of any mother isotope in the Pb-212 drug product is a radiation and health hazard to patients receiving the drug product due to long half-life and energy profile of Th-228 and Ra-224.

The method of the present disclosure takes a different approach which is very different than the previous chemical separation methods described above. Additionally, the method of the present disclosure had several advantages over exiting methods for generating Pb-212 by emanation. Weaknesses and drawbacks of current methods for generating Pb-212 via emanation include, for example, using Ra-224 as feedstock/parent isotope loaded on emanation source which suffers from same issues stated above with respect to chemical separation methods, using solid organic phase target material such as urea or other organic materials to capture and trap Rn-220, and using residual solvents as a final destination for capturing and trapping Rn220. This solid phase organic material further needs to be dissolved in an acid and go through a chemical separation to extract Pb-212 that has resulted from decay of Rn-220. These previous methods require high-performance liquid chromatography (HPLC) quality control to verify there is no carry over or cross contamination of urea or any other organic material used in the process of separation and extraction of Pb-212. Any carryover of organic material used in separation could be more than a maximum tolerable dose or limit (MTD/l) indicative of toxicity in patients.

Capturing of Rn-220 has also been done using organic liquid media (residual solvents) such as methanol or hexanol. This method requires further distillation, evaporation, filtration, and chemical separation of Pb-212 resulting from the decay of Rn-220 in the organic liquid media to assure separation and extraction of Pb-212 isotope free of methanol, hexanol or any residual solvent in general. Such separation is difficult and cumbersome to scale up. This process also requires Gas Chromatography (GC) to test any residual organic compounds before release of the Pb-212 product to patients, which is not suitable to scale up or readily adaptable to a production environment outside of a small laboratory setting. The presence of residual solvents in final drug product for patient dosing and treatment is dangerous and is considered a limiting step in final Pb-212 drug product currently utilized for treatment.

Another important issue with existing emanation technologies in production of Pb-212 beside the above-mentioned capturing issues of Rn-220 is the method in which the parent isotope or feedstock is loaded on the emanation source and the material of which the emanation source is made. Materials that have been used in building emanation sources in existing methods include resins, salts, or materials that are subjected to radiolysis when high amount of Th-228 or Ra-224 is loaded into previously used emanation sources. All existing methods lack a safe and efficient method of introducing the feedstock/parent isotopes to emanation source. In current methods an operator first must introduce the feedstock/parent isotope manually to the emanation source and then manually place the emanation source inside of an emanation box. This is a hazardous and cumbersome process which cannot be done when dealing with commercial and high activity production systems.

Due to the drawbacks of existing methods for production of Pb-212, there is a need for an efficient and safe method to produce and extract Pb-212 that addresses the shortcomings of the existing methods and systems.

SUMMARY OF THE INVENTION

The present disclosure provides an apparatus and method for production of Pb-212 using a Thorium-228 (Th-228) feedstock/parent isotope, which has a half-life of 1.92 years. For instance, in accordance with certain illustrative embodiments, the present disclosure is directed to an apparatus for producing Pb-212. In certain implementations, the apparatus may include a Th-228 feed container, an emanation box, a carrier gas feed, emanation box and source loading apparatus, heating block, and a Rn-220 target system. In accordance with certain illustrative embodiments, the Th-228 feed container and the carrier gas feed may be coupled to the emanation box. In certain embodiments, the emanation box may be coupled to the Rn-220 target system.

In one embodiment, the present disclosure provides a method for producing Pb-212 isotope. The method includes introducing Th-228 into an emanation box, wherein the emanation box comprises an emanation source comprising a high-surface area material. The method also includes introducing a carrier gas into the emanation box through a carrier gas feed, wherein the carrier gas is an inert gas and the carrier gas flows through the emanation box. The Th-228 decays to Rn-220 within the emanation box and the carrier gas carries the Rn-220 resulting from decay of the Th-228 in the emanation box to one or more Rn-220 targets through a multi-way valve coupled to a carrier gas exit port of the emanation box. The method further includes separating the Rn-220 from the carrier gas in the one or more Rn-220 targets, directing the carrier gas out of the one or more Rn-220 targets through a carrier gas exhaust port, directing a liquid through a liquid feed into the one or more Rn-220 targets, and allowing the Rn-220 to undergo radioactive decay into Pb-212 isotope within the one or more Rn-220 targets. The liquid dissolves the Pb-212 isotope produced by radioactive decay of Rn-220 within the one or more Rn-220 targets. The method further includes directing the liquid containing the Pb-212 isotope from the one or more Rn-220 targets to a Pb-212 collection container and separating the Pb-212 isotope from the liquid.

In another embodiment, the present disclosure provides an apparatus for producing Pb-212 comprising an emanation box, wherein the emanation box comprises an emanation source comprising a porous non-reactive material, and the emanation box receives at least one of Th-228 and Ra-224 at an inlet, and the at least one of Th-228 and Ra-224 decays to Rn-220 within the emanation box. The apparatus also includes a carrier gas feed coupled to the emanation box, wherein the carrier gas feed directs an inert gas into the emanation box and the inert gas carries the Rn-220 out of the emanation box through a carrier gas exit port of the emanation box coupled to a multi-way valve. The apparatus further includes one or more Rn-220 targets coupled to the carrier gas exit port through the multi-way valve, wherein the carrier gas carries the Rn-220 from the emanation box to the one or more Rn-220 targets and wherein the Rn-220 decays into Pb-212 within the one or more Rn-220 targets. A liquid feed is coupled to the one or more Rn-220 targets. The liquid feed directs a liquid into the Rn-220 targets such that the liquid becomes in contact with the carrier gas carrying the Rn-220 to the Rn-220 targets and the Pb-212 resulting from decay of the Rn-220 is transferred to the liquid by contact between the carrier gas and the liquid. A Pb-212 collection container is coupled to the Rn-220 target system and the generated Pb-212 is directed into the Pb-212 collection container.

In yet another embodiment, the present disclosure includes an emanation box comprising an emanation source comprising fins, wherein the fins are made of a non-reactive porous material and wherein Th-228 in a solvent is directed into the emanation box and adsorbed onto the fins of the emanation source. A shield structure is positioned around the emanation source, wherein the shield structure is operable to absorb radiation generated by radioactive decay of the Th-228 in the emanation box. The emanation box includes a carrier gas feed port, wherein the carrier gas feed port is operable to provide an inlet for a carrier gas directed into the emanation box. The emanation box also includes a carrier gas exit port, wherein the carrier gas exit port is operable to provide an exit for the carrier gas from the emanation box. The emanation box further includes an evaporation exit port, wherein the evaporation exit port is operable to provide an exit for evaporated solvent. The emanation box further includes a heat source, wherein the heat source is operable to provide heat to the emanation box to evaporate the solvent.

The present disclosure provides for an apparatus and method for producing Pb-212 which requires less frequent feedstock/parent isotope replenishment, higher yield due to emanation source design, safe and efficient loading of the emanation box that contains the emanation source, a safe and efficient transfer method of Rn-220 via carrier gas, a safe and efficient capture method of Rn-220 that may include a cryogenic effect, and oscillation between targets that capture Rn-220 and hold it during decay of Rn-220 to Po-216 and eventually to Pb-212. Moreover, in certain embodiments, this novel technology may be operated by a GMP operating software. The disclosed methods and systems are well shielded, easy to repair, can be scaled up using high activities and provide a higher degree of safety to operators of the apparatus than prior systems. The methods and systems disclosed herein also provides theoretical radionucleic purity of 100% since there is no carry-over or residual of Th-228 or Ra-224 in the final Rn-220/Pb-212 collecting targets. Additionally, in certain illustrative embodiments the disclosed methods and systems differ from previous emanation methods of producing Pb-212 by not using solid organic extraction/collection of Rn-220 using organic material such as urea or liquid phase such as residual solvents (e.g., methanol or hexanol) to capture Rn-220 permitting it to decay to Pb-212. Furthermore, separation of Pb-212 without using organic solvents or residual solvents as disclosed herein produces a final product that is safer for medicinal use and that requires less exacting and extensive testing to ensure safety. Yet another advantage of the methods and systems disclosed herein includes a higher yield of Pb-212 due to the conversion of Rn-220 to Pb-212 in an aqueous solution rather than on a solid organic extraction resin or residual solvents as in previous methods.

These recited advantages are illustrative only and are not intended to be an exhaustive list of the advantages of the methods and systems disclosed herein. Other advantages are evident to those of ordinary skill in the art, having the benefit of the present disclosure. The present disclosure may comprise one or more of the following features or a combination thereof.

BRIEF DESCRIPTION OF THE FIGURES

The disclosed subject matter will hereafter be described with reference to the accompanying drawings, wherein like reference numerals denote like elements, and.

Figure 1:
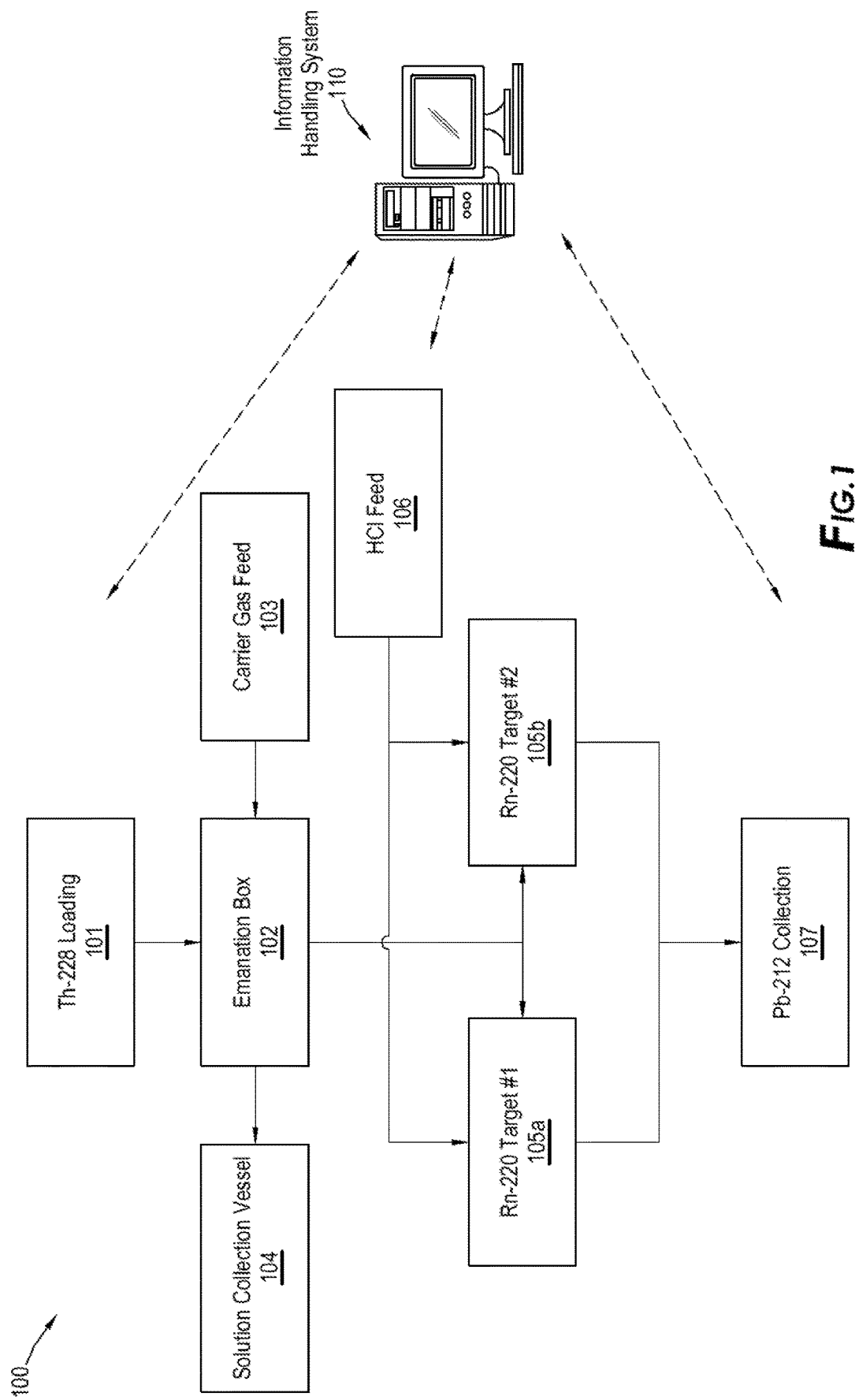
FIG. 1 depicts a block diagram of an apparatus for producing and separating Pb-212 in accordance with an illustrative embodiment of the present disclosure.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

As used herein, the terms "coupled" or "couple" include both a direct connection and an indirect connection between components. With respect to components that direct fluids from one component to another, the terms "couple" or "coupled" includes connections via a pipe or other ducting to provide fluid communication between components.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a laptop computer, a smartphone, a PDA, a consumer electronic device, a network storage device, or another suitable device and may vary in size, shape, performance, functionality, and price. The information handling system may include memory, one or more processing resources such as a processor (e.g., a central processing unit (CPU) or hardware or software control logic). Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Further, in the figures and the description, like numerals are intended to represent like elements.

With reference to FIG. 1, a block diagram of an apparatus 100 for producing Pb-212 in accordance with an illustrative embodiment of the present disclosure is shown. The apparatus includes a Th-228 feed vessel 101 coupled to an emanation box 102. An $N_2$ feed 103 is coupled to the emanation box 102 and an outlet of the emanation box 102 is coupled to a solution collection vessel 104. Additionally, one or more Rn-220 collection targets 105a, 105b are coupled to the emanation box 102. In some embodiments, the apparatus 100 may additionally include an acid solution feed 106 and a Pb-212 collection vessel 107. In certain embodiments the one or more Rn-220 targets may include a first Rn-220 target vessel 105a and a second Rn-220 target vessel 105b as shown in FIG. 1. The functions of each component of FIG. 1 is explained in more detail below with respect to FIG. 2.

In certain illustrative embodiments, the apparatus of FIG. 1 may be controlled by an information handling system 110. For instance, the information handling system 110 may be a computerized automation system utilizing software-based controls, such as GMP software. GMP software, as used herein, refers to "good manufacturing practice" software, that is manufacturing automation software that adheres to a set of standards referred to as "good manufacturing practice." The structure and operation of GMP software is well known to those of ordinary skill in the art, having the benefit of the present disclosure, and therefore, it will not be discussed in detail herein. For example, in certain illustrative embodiments, one or more pumps or valves located between each unit may be controllable by the information handling system 110 implementing an automation system. Additionally, in certain illustrative embodiments, the temperatures of each unit and/or the materials contained in each unit or transported between each unit may be monitored and/or controllable by information handling system 110 implementing an automation system. Such an automation system reduces the need for human interaction with the apparatus compared to previous methods for production and isolation of Pb-212 and increases the safety of operators due to the reduced need for human intervention.

Figure 2:
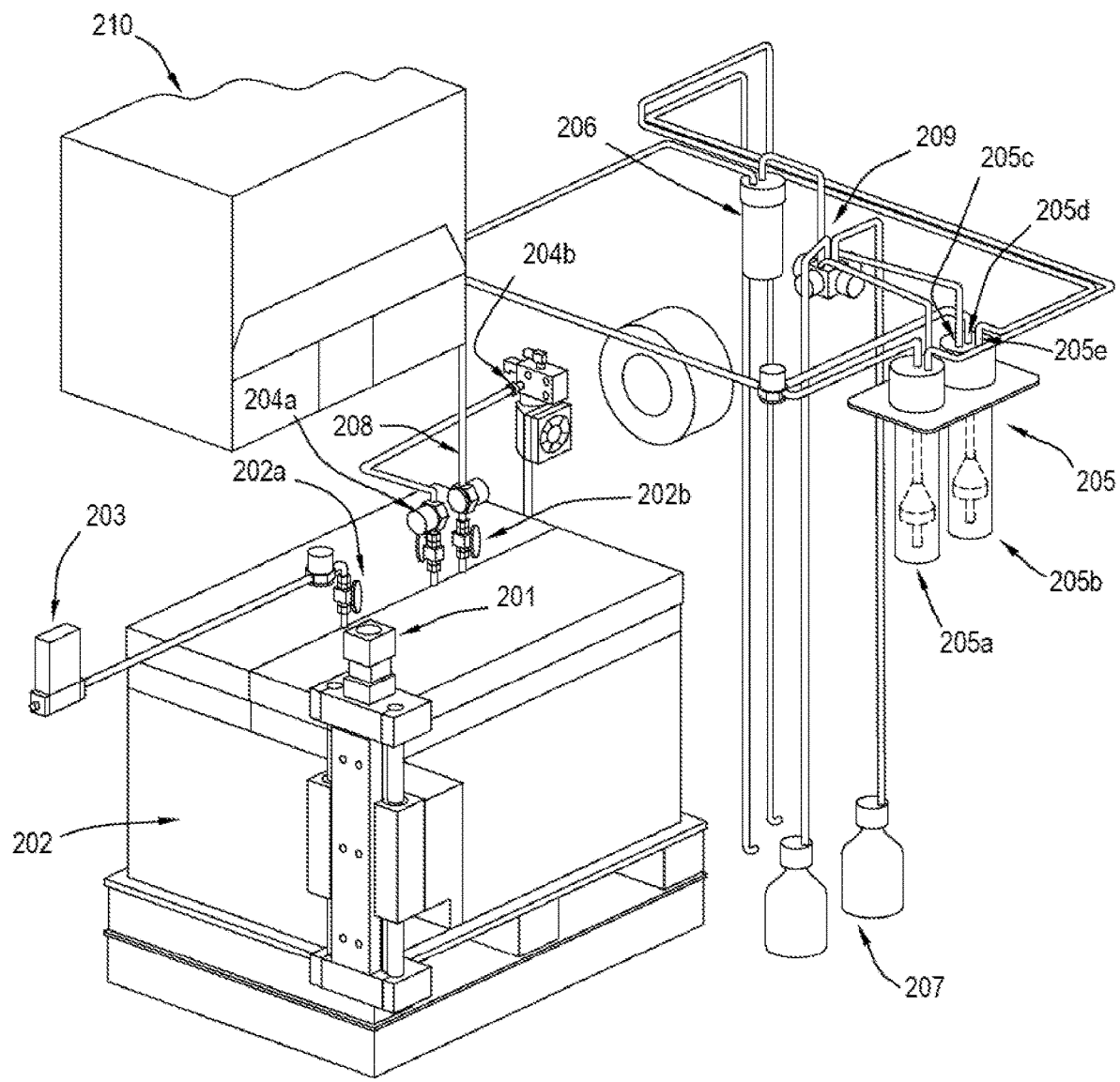
FIG. 2 depicts a perspective view of an apparatus for producing and separating Pb-212 in accordance with an illustrative embodiment of the present disclosure.

FIG. 2 is a perspective view of the apparatus illustrated in block diagram of FIG. 1. The exemplary embodiment illustrated by FIG. 2 includes a Th-228 feed 201, an emanation box 202, $N_2$ carrier gas feed 203, $N_2$ exit port 208 for carrying Rn-220 to Rn-220 collecting targets 205, emanation box evaporation exit port 204a coupled to Peltier system 204b (e.g., any commercially available electric cooler utilizing the Peltier effect, as would be known to those of ordinary skill in the art having the benefit of this disclosure), Pb-212 collection container(s) 207, and control system 210. As shown in FIG. 2, the system further includes various valves and piping utilized to direct and/or regulate flow of materials between the various system components. In certain illustrative embodiments, the control system 210 may include an information handling system 110, as described above, that is operable to control the valves and pumps through the apparatus of FIG. 2 utilizing process control software coupled to various sensors, such as flow meters, thermocouples, pressure transducers and the like. The structure and operation of such process control software and the manner in which they control various sensors, such as flow meters, thermocouples, pressure transducers and the like would be apparent to those of ordinary skilled in the art having the benefit of the teachings herein and are therefore not discussed in detail. For example, control system 210 may be operable to monitor the temperature of Rn-220 targets 205 and increase or decrease cooling to Rn-220 targets 205 if the monitored temperature deviates from a desired set point. Additionally, control system 210 may, in some embodiments, house raw material vessels, such as vessels containing the various solutions, acids, and gases described herein, and be operable to supply those materials to the various modules of the apparatus of FIG. 2. In certain illustrative embodiments, the user may regulate the flow rates of materials supplied to, received from, and directed through the apparatus by manually controlling valves (not labeled) placed in the lines and pipes throughout the apparatus. In certain embodiments, control system 210 may be communicatively coupled to the valves and may selectively automatically open and close the valves based on predetermined parameters. In yet other embodiments, control system 210 may provide a user interface allowing a user to regulate the valves through that user interface. The illustrative embodiment comprises a Th-228 feed 201 that is coupled to the emanation box 202. The Th-228 may be disposed in the Th-228 feed 201 and introduced into the emanation box 202 from the Th-228 feed 201. In some embodiments the Th-228 feed 201 may be disposed within the emanation box 202. Th-228 feed 201 provides a means to supply Th-228 to emanation box 202. In the illustrative embodiment, emanation box 202 has a first distal end 202a and a second distal end 202b. The first distal end 202a of emanation box 202 is fluidically coupled to the $N_2$ carrier gas feed 203 which provides a flow of $N_2$ carrier gas, or other inert carrier gas, to the emanation box 202. Although referred to as $N_2$ carrier gas throughout the present disclosure, any inert gas may be used as a carrier gas. The second distal end 202b of emanation box 202 is coupled to Rn-220 targets 205 through $N_2$ carrier gas exit 208. In accordance with certain illustrative embodiments, the emanation box 202 includes an emanation source, for example, emanation source 506 of FIG. 5 and in detail as emanation source 600 of FIG. 6, and a heat source (e.g., heat source 507 of FIG. 5), as described in more detail with respect to FIGS. 3, 4, 5 and 6. The emanation box 202 is fed Th-228 through Th-228 feed 201, as described in more detail below, and provides residence time for Th-228 on the emanation source while Th-228 undergoes radioactive decay to Rn-220. $N_2$ carrier gas feed 203 provides a flow of $N_2$ carrier gas through emanation box 202, the $N_2$ carrier gas carries any Rn-220 resulting from the decay of Th-228 in emanation box 202 to Rn-220 targets 205 through $N_2$ carrier gas exit 208. According to certain illustrative embodiments, Rn-220 targets 205 may have an $N_2$ carrier gas inlet port 205c, liquid inlet and exit ports 205d, and $N_2$ carrier gas exhaust port 205e. Rn-220 targets 205 serve as a vessel for separation of Rn-220 from the $N_2$ carrier gas and residence space for Rn-220 to undergo radioactive decay into Pb-212 as described in more detail below. Liquid feed 206 may be coupled to Rn-220 targets 205 to provide a liquid, such as an acid solution, to dissolve Pb-212 produced by radioactive decay of Rn-220 in Rn-220 targets 205. In certain illustrative embodiments, the same liquid feed line 206 may provide an exit line for liquid solution containing Pb-212 and may couple the Rn-220 targets 205 to Pb-212 collection vessels 207 through a multi-way valve 209 that is operable to control flow into and out of Rn-220 targets 205.

The Th-228 feed 201 is coupled to emanation box 202 and provides a means for Th-228 to be transferred into the emanation box 202. In certain embodiments, the Th-228 may be dissolved in a liquid before being transferred to the emanation box 202. In some embodiments, the Th-228 may be dissolved in nitric acid ($HNO_3$), or another acid, before being transferred to the emanation box 202. In other embodiments, the Th-228 may be purchased in solution and vials of the Th-228 may be loaded into the apparatus shown in FIG. 2 and be transferred to the emanation box 202 as such. After being loaded into the apparatus, a portion of the Th-228 solution may be transferred to the emanation box 202, which is described in more detail below. As would be appreciated by those of ordinary skill in the art, having the benefit of the present disclosure, handling radioactive materials such as the Th-228 solution involves certain risks and any mishaps in the process can lead to undesirable consequences. Accordingly, in order to mitigate such risks, in certain illustrative implementations the emanation box 202 may store Th-228 for an extended operational period, obviating the need for repeated handling of Th-228 and minimizing the associated risks with that procedure. For instance, in certain illustrative embodiments, the emanation box 202 may store a supply of Th-228 that will last for a year. In certain embodiments, the emanation box 202 may store 1000 millicurie (mCi) of Th-228. In some embodiments Th-228 may be loaded into the system from vials containing Th-228 through Th-228 feed 201. Th-228 feed 201 be any appropriate system for transferring a quantity of dissolved Th-228 from a vial or other storage vessel or media into emanation box 202, as would be understood by one of skill in the art having the benefit of this disclosure. For example, Th-228 feed 201 may be an automated syringe drive, vacuum system, or pressurized system that interfaces with and is controlled by control system 210. For instance, in some embodiments Th-228 may be loaded into the apparatus on monthly, bimonthly, semi-annual or annual basis, which reduces the risk of handling a radioactive material. The Th-228 may be loaded dissolved in an acid, for example HCL or 3M $HNO_3$, or any desired molarity of an acid that could dissolve Th-228 or any isotope in its decay chain such as Ra-224.

Figure 5:
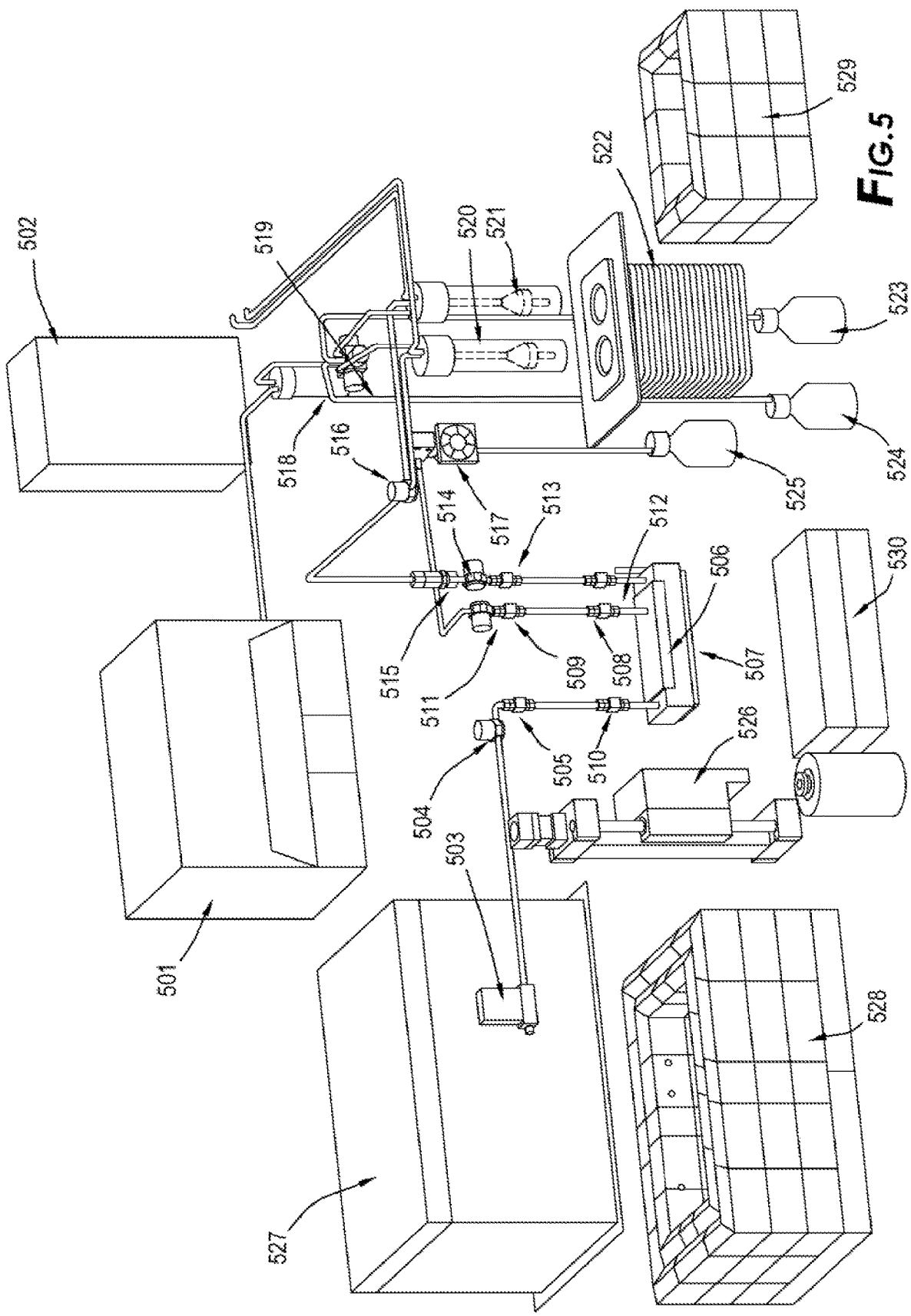
FIG. 5 is a perspective view of an apparatus for producing and separating Pb-212 in accordance with an illustrative embodiment of the present disclosure.

In other embodiments, Th-228 or Ra-224 may be loaded into the emanation source (e.g. emanation source 506) prior to incorporation into the apparatus of FIGS. 2 and 5. For example, Th-228 or Ra-224 in solution may be loaded into an emanation source and the solvent (acid) may be evaporated at a centralized remote facility. The emanation source loaded with Th-228 or Ra-224 may then be radiation shielded and shipped in accordance with DOT regulations to a Pb-212 production facility housing the apparatus described herein for incorporation into said apparatus and production of Pb-212 as described herein, as would be understood by one of skill in the art having the benefit of this disclosure. In such embodiments the emanation source may be periodically replaced with a freshly loaded Th-228 or Ra-224 containing emanation source after as set amount of time or once the activity of the Th-228 or Ra-224 in the prior emanation source has decreased to a predetermined level. In some embodiments the spent emanation source may be shipped back to the centralized Th-228 and Ra-224 loading facility for cleaning and reloading of Th-228 or Ra-224.

In another embodiment, an Ra-224 solution may be loaded into Th-228 feed 201 periodically. For example, once or twice a week due to Ra-224's shorter half-life when compared to Th-228. In such an embodiment, the Ra-228 may be dissolved in an acid such as 3M $HNO_3$ or HCL. After loading the Th-228 solution or Ra-224 solution may be heated to evaporate the liquid and deposit the Th-228 or Ra-224 on the emanation source within the emanation box 202 as described below.

Figure 3:
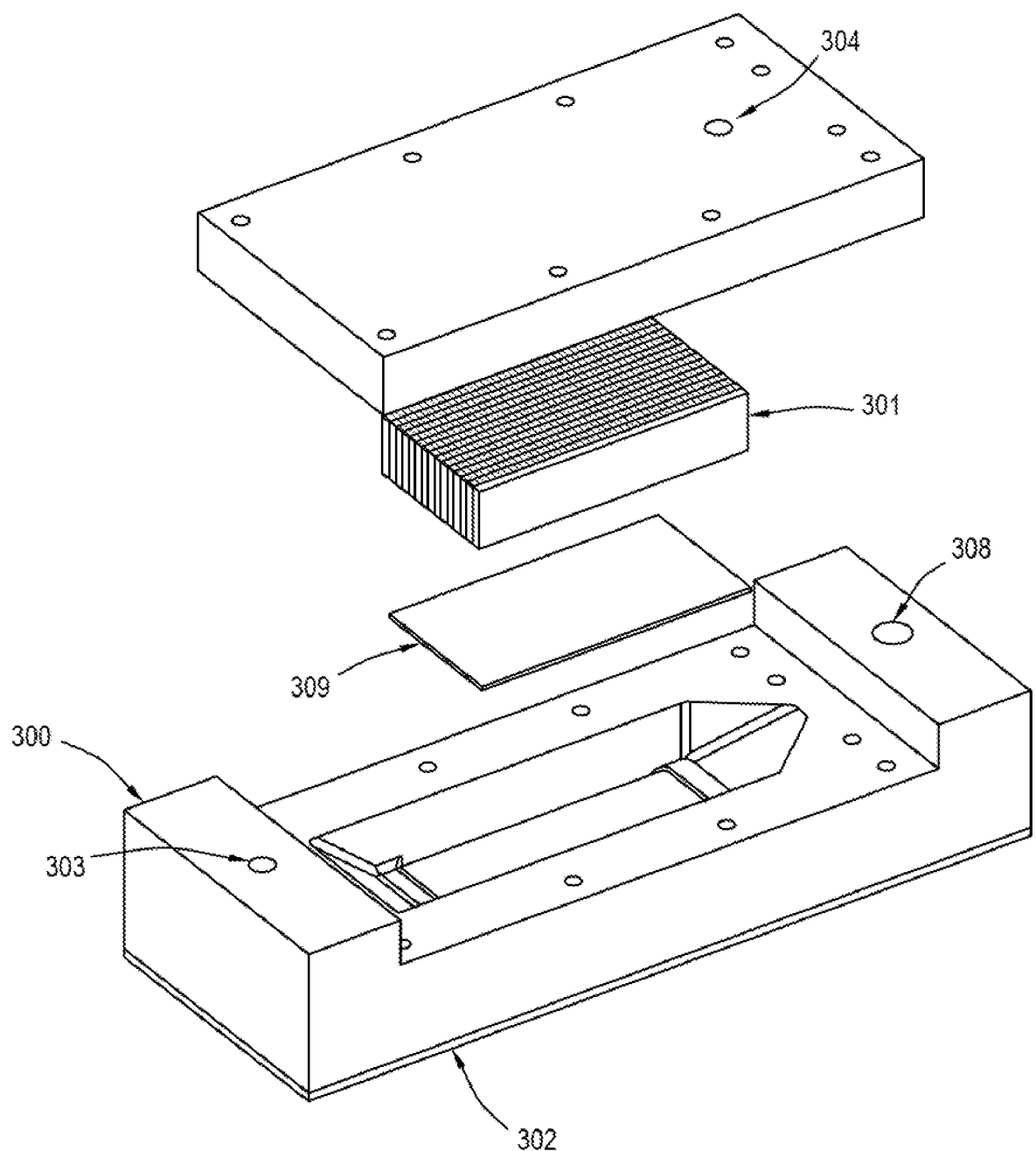
FIG. 3 is a close-up perspective view of an emanation source within the emanation box in accordance with an illustrative embodiment of the present disclosure.
Figure 4:
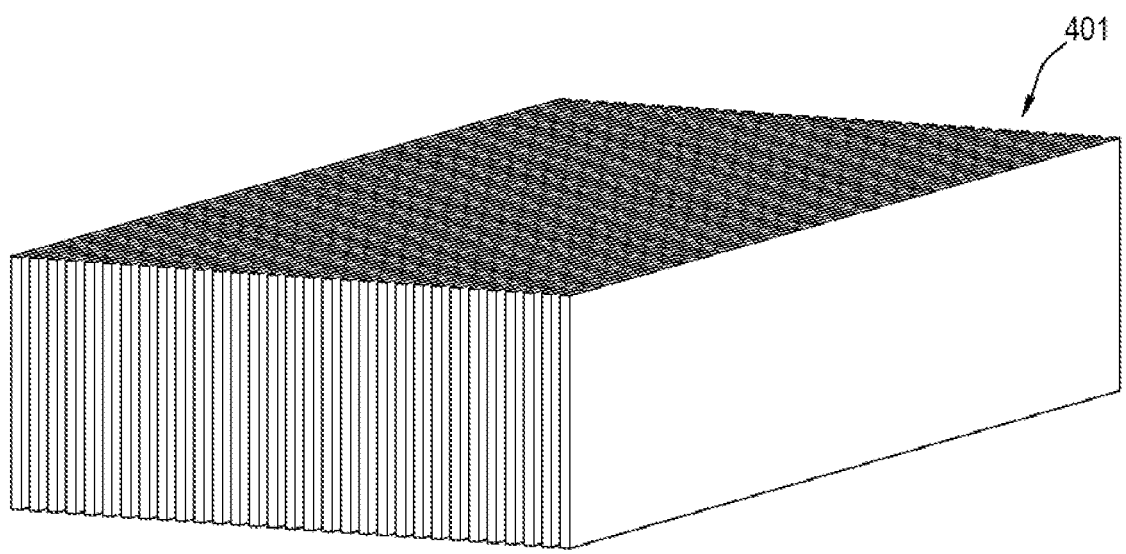
FIG. 4 is a close-up perspective view of an emanation source in accordance with an illustrative embodiment of the present disclosure.
Figure 4:
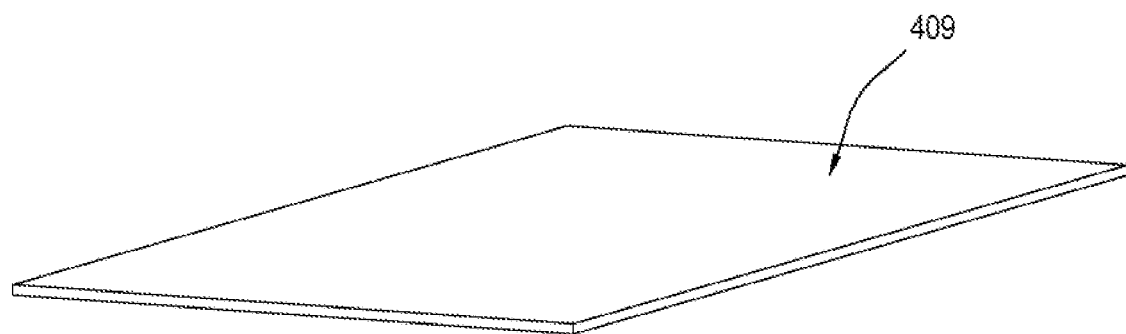

FIGS. 3 and 4 illustrate a close-up perspective view of emanation source 300 within the emanation box 202. Upon introduction into the emanation source 300, the Th-228 is dispersed onto the flow distribution fins 301 by evaporation of the carrier solution as described below. The flow distribution fins 301 is a high surface area component made with any desirable material that the Th-228 may adsorb onto. In certain illustrative embodiments, the high surface area material may be a porous material with a porosity desirable for the particular application. For instance, in certain non-limiting illustrative embodiments, the porosity of the material comprising the flow distribution fins 301 may be between approximately 2 μm and approximately 200 μm. As would be appreciated by those of ordinary skill in the art, having the benefit of the present disclosure, other porosities may be used as desired without departing from the scope of the present disclosure. The material of the flow distribution fins 301, in some embodiments, may have a large surface area. For instance, in certain embodiments, the surface area of the flow distribution fins 301 may be greater than approximately 10000 $m^2$. The flow distribution fins 301 may be comprised of any desirable materials including, but not limited to, a metal, a ceramic lattice, or foam. In certain embodiments, the high surface area material may be porous titanium, silica, tungsten, zirconium, platinum, gold, iridium, rhenium, ceramics, or combinations thereof. In some embodiments the flow distribution fins 301 may have a finned structure including multiple fins constituting a high surface area material. The emanation source 300 may also include a flow distribution plate 309 to provide an attachment point for flow distribution fins 301 and provide additional surface area for Th-228 deposition. Flow distribution plate 309 may be made of a high surface area material. For example, in certain non-limiting illustrative embodiments, the porosity of the material comprising the flow distribution plate 309 may be between approximately 2 μm and approximately 200 μm. In some embodiments, flow distribution plate 309 may be made of the same material as flow distribution fins 301. In other embodiments, flow distribution plate 309 may be made of a different material than flow distribution fins 301 such as, for example, porous zirconium if flow distribution fins 301 are made of porous titanium.

Figure 7:
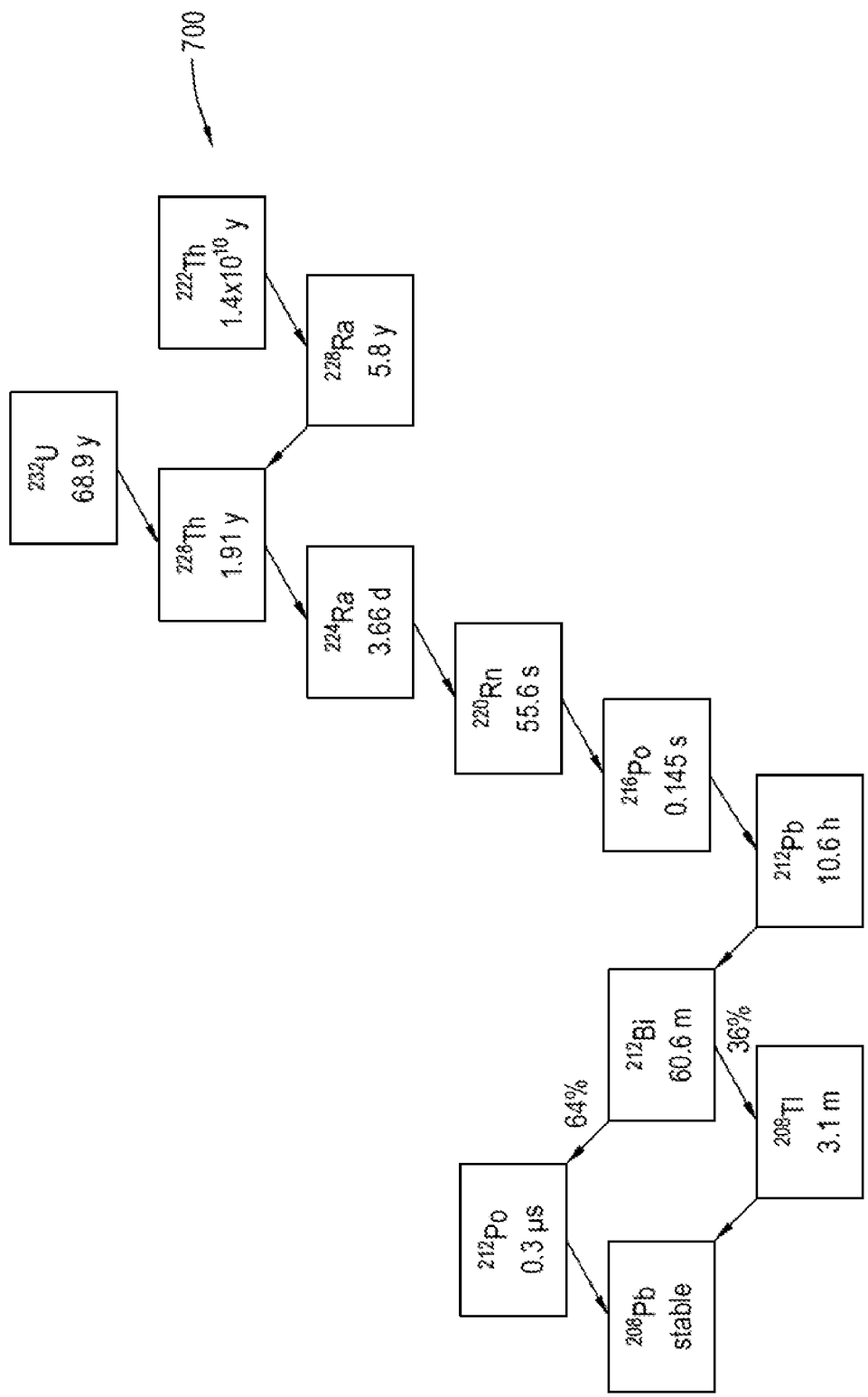
FIG. 7 provides an illustration of the decay chain of Thorium-228 (Th-228).

The flow distribution fins 301 holds the Th-228 as it undergoes radioactive decay. FIG. 7 depicts the decay path 700 of Th-228. Specifically, Th-228 first decays into Ra-224, as seen in FIG. 7, which is also adsorbed onto the flow distribution fins 301. The Ra-224 then decays into Rn-220, which is not adsorbed onto the flow distribution fins 301. After decaying to Rn-220, the Rn-220 may be carried out of the emanation source 300 through $N_2$ carrier gas exit port 308 by a flow of $N_2$ carrier gas that is supplied to the emanation source 300 through $N_2$ carrier gas entry port 303. As is described further herein, the $N_2$ carrier gas may carry the Rn-220 to Rn-220 targets 205 where the Rn-220 undergoes radioactive decay into Pb-212.

The emanation box 202 may also include a heat source 302 under the emanation source 300. In some embodiments the heat source 302 may be located outside of the emanation source 300 and in contact with the emanation source 300. In certain illustrative embodiments, the heat source 302 may be an electrically controlled hot plate or heating element and may be controlled by the information handling system of the control system 210. The heat source 302 supplies heat to evaporate the solvent carrying the Th-228 from the Th-228 feed 201. When the liquid portion of the solution has evaporated, the Th-228 is left on the flow distribution fins 301.

The evaporated liquid may exit the emanation source 300 through an evaporation exit port 304. In certain illustrative embodiments, the evaporation exit port 304 may be disposed on a top surface of the emanation source 300. In certain illustrative embodiments, the evaporation exit port 304 may be coupled to a solution collection vessel (e.g. condensing bottle 525 of FIG. 5) and coupled to a heat exchanger, such as Peltier cooler 204*b*, to cool the evaporated solution which may be collected in the solution collection vessel. In other embodiments, the heat exchanger may be positioned in the line between the evaporation exit port 304 and the solution collection vessel. In certain illustrative embodiments, the heat exchanger may be an electrically powered Peltier-effect cooling device that cools the evaporated solution for collection as a liquid. Peltier-effect cooling devices are electrically powered coolers which use the Peltier-effect to convert electric energy into thermal movement, allowing for cooling of one side of the device and transfer of heat to the other. Such coolers are well known to those of ordinary skill in the art having the benefit of this disclosure. An embodiment of the evaporation exit port 304 and Peltier-effect cooler described above is illustrated in FIG. 2.

FIG. 4 provides close up, perspective illustration of the interior components of the embodiment of the emanation source 300 described herein. The emanation source 300 illustrated includes flow distribution fins 401 and flow distribution plate 409. Flow distribution fins 401 may correspond to the component referred to as emanation source 301 with respect to FIG. 3 and may be constructed of any high surface area material described herein. Flow distribution fins 401 have a finned structure of multiple, closely spaced fins to provide multiple paths for the flow of $N_2$ carrier gas through the emanation source 300. Flow distribution plate 409 holds flow distribution fins 401 in place and provides surface area in addition to that provided by flow distribution fins 401 for Th-228 deposition.

Returning to FIG. 2, the emanation source (e.g., emanation source 300) within emanation box 202 is fed with a $N_2$ carrier gas feed 203. The $N_2$ carrier gas feed 203 supplies an $N_2$ carrier gas which carrier gas that carries Rn-220 out of the emanation source (e.g., emanation source 300) within emanation box 202 through $N_2$ carrier gas exit port 208 to the Rn-220 targets 205. In particular embodiments, the $N_2$ feed rate may be automatically controlled. For instance, in certain illustrative embodiments, the $N_2$ feed rate may be controlled by mass flow using a mass flow meter to control the flow of $N_2$ carrier gas at a desired level and an inlet valve controlled by control system 210. The $N_2$ feed may be operable shut off flow to emanation box 202 by the inlet valve, which may be followed by one or more manual valves in case of failure of inlet valve. In certain embodiments, the flow may be controlled by the information handling system incorporated into control system 210. For instance, in certain illustrative embodiment it may be desirable to flow the $N_2$ carrier gas at a rate suitable for this fixture. This rate may be adjusted via the mass flow system based on the size and number of collecting targets and other variables embedded in this system. In a particular embodiment, the $N_2$ feed rate may be controlled at approximately 200 mL/min. The mass flow controlled $N_2$ carrier gas feed 203 may comprise a $N_2$ carrier gas feed line, inlet valve, and mass flow meter as described in more detail with respect to FIG. 5. The inlet valve and mass flow meter may be operable to control the mass flow of the $N_2$ carrier gas flowing through the $N_2$ carrier gas feed line using control methodologies apparent to those skilled in the art having the benefit of the teachings herein. For example, the inlet valve and mass flow meter may be coupled in a simple feedback control loop scheme. In the illustrative embodiment of FIG. 2, the inlet valve and mass flow meter may be coupled to control system 210. $N_2$ carrier gas flows into the emanation box 202, carries any Rn-220 that has been produced as a result of the decay of Th-228 and/or Ra-224 in the emanation box 202, and carries the Rn-220 to the Rn-220 targets 205.

As described above, the Rn-220 targets 205 may be comprised of one or more vessels for collection of Rn-220. For instance, in a particular embodiment the Rn-220 targets 205 may include a first vessel 205a and second vessel 205b for collection Rn-220. In another embodiment, the Rn-220 target 205 may be a single vessel. In some embodiments, the Rn-220 target 205, whether one, two, or more vessels, may be filled with a cooled acid solution. The acid solution may be any suitable acid solution such as, for example, hydrochloric acid (HCl). The acid solution may be cooled to a temperature in the range of approximately −72° C. to −95° C. In another embodiment, the acid may be $HNO_3$. In other embodiments, the Rn-220 target 205 may be filled with an uncooled acid solution at ambient temperature. In yet other embodiments, the Rn-220 target 205 may include one or more vessels containing a zeolite, metal zeolite-type chalcogenide (e.g. germanium, tin, zinc, or a combination thereof, chalcogenides with a zeolite-like structure), or tin-rich germanium surface target. In some embodiments, the vessels containing the surface target may also be filled with a cooled or non-cooled acid solution, for example an aqueous buffer solution. In other embodiments the Rn-220 target 205 containing a surface target may include a nozzle to spray an acid or other aqueous solution onto the walls of the target vessel. In embodiments in which the Rn-220 targets 205 include a zeolite, metal zeolite-type chalcogenide, or tin-rich germanium surface target, the Rn-220 targets may not be filled with a liquid.

In an embodiment, the Rn-220 target 205 may function as described below. The first and second Rn-220 targets 205 may include vessels containing an acidic solution. The acidic solution may include an HCl, $HNO_3$, or any other aqueous, non-organic acid or buffer solution. For purposes of explanation, an HCl solution is described below, however the description may apply to any aqueous acid solution and the methods and systems described herein are not limited to using an HCl solution. In some, embodiments the first and second Rn-220 targets 205 may be fed by an automated liquid feed 206. In a particular embodiment, the HCl solution fed from the liquid feed 206 may be a 20% HCl solution. In another embodiment, the HCL solution may have a concentration of 22.5%. In other embodiments, the concentration of HCl may be between 10% and 50%. In some embodiments, the concentration of HCl may be between 15% and 30%. In particular embodiments, the concentration of HCL may be between 20 and 25%. In particular embodiments, the concentration of HCL may be between 22% and 27%. In a particular embodiment, the concentration of HCL may be 25%. In another embodiment, the Rn-220 targets 205 may be fed by a 3M $HNO_3$ solution.

The first and second Rn-220 targets 205 may also include a temperature control unit/system (such as cooling bath 522 illustrated in FIG. 5) to cool the HCl solution to a temperature below −72° C. and above −95° C. and maintain the HCl solution at that temperature. In a particular embodiment, the temperature control system may cool the HCl solution to −85° C. and maintain the HCl solution at that temperature. In another embodiment, the HCL solution may be cooled to −82° C. In yet another embodiment, the temperature control unit may cool an $HNO_3$ solution to approximately −41° C. In some embodiments, the temperature control unit may be operable to cool a liquid in the Rn-220 targets 205 to a temperature above the freezing point of the liquid to increase Rn-220 solubility in the liquid.

When the $N_2$ carrier gas containing Rn-220 contacts the cooled HCl solution, the Rn-220 freezes because Rn-220 has a freezing point of −72° C. In some embodiments, the target material may include a zeolite or zeolite-like chalcogenide material that absorbs the Rn-220 instead of freezing it in a cool acid solution. In other embodiments, the Rn-220 targets 205 may contain a liquid acid solution, at or below ambient temperature, that dissolves the Rn-220 fed to the Rn-220 targets. The $N_2$ carrier gas may then exit the first or second Rn-220 targets 205 free of Rn-220. The Rn-220 left in the Rn-220 target vessels decays into Po-216, which is dissolved into the HCl solution. The Po-216 then rapidly decays into Pb-212 while dissolved in the HCl solution. Because Rn-220 has a half-life of 55.6 seconds and is frozen when contacting the acid solution, feed of the $N_2$ carrier gas containing Rn-220 may be switched between the first Rn-220 target 205a and the second Rn-220 target 205b roughly once a minute to replenish the supply of Rn-220. However, in some embodiments only a single Rn-220 target 205 may be used. In other embodiments, flow of the $N_2$ carrier gas may be switched between the Rn-220 targets 205 at longer intervals, such as 2 or 3 minutes. In another embodiment, flow of $N_2$ carrier gas may be switched between the Rn-220 targets 205 every 10 minutes. Because Rn-220 has a half-life of 55.6, 10 minutes provides time for approximately 10 Rn-220 half-lives to pass, which provides enough time for the Rn-220 to nearly entirely decay to Pb-212. While the other vessel is waiting for 10 minutes to pass the flow of Rn-220 will go to second Rn-220 target vessel for duration of 10 minutes. At end of 10 minutes the exit valve at the second Rn-220 target vessel one will open to let out the $N_2$ gas out and be ready for next cycle. At this point, the exit valve on the first Rn-220 target will close for 10 minutes. This oscillation cycle will continue until a desired amount of Pb-212 is collected in each Rn-220 target vessel. This oscillation cycle, time of residence (i.e. the time between entrapment and release), the volume in which each vessel can take, and the number of vessels may be changed based on needs of the process. In certain illustrative implementations, the automated filling system of the apparatus, controlled by control system 210, may alternate between filling a first Rn-220 target 205, waiting 10 minutes for 10 Rn-220 half-lives to pass, filling the second Rn-220 target 205 during this time, returning to filling the first Rn-220 target 205 after 10 minutes has passed since the previous filling of the first Rn-220 target 205, then returning to filling the second Rn-220 target 205 after 10 minutes has passed since the previous filling of the second Rn-220 vessel, and so on alternating between filling the vessels and waiting, until the control system 210 determines based on flow rates, Rn-220 target 205 volume, number of oscillations, and wait time, that an Rn-220 target 205 contains a desired amount of Pb-212. At this point, the resulting Pb-212 solution may be emptied from one of the Rn-220 target vessels (e.g., 205a). In certain embodiments, this process may be automated and may be performed by the control system 210 which may be implemented using an information handling system. For example, the automated control system may comprise a multi-way valve 209 controlled by control system 210, that is operable to switch between filling the first and second Rn-220 targets 205a, 205b upon receiving a command from the control system 210. The Pb-212 dissolved in the HCl solution may then be removed from the Rn-220 target vessels as needed. Separation of Pb-212 from the HCl solution may be accomplished by methods known to those of ordinary skill in the art having the benefit of the present disclosure.

In other embodiments one or more Rn-220 targets may be filled based on a known flow rate of the carrier gas (for example, measured by a mass flow meter on the carrier gas feed 203) and a pressure measured in each Rn-220 target (for example, by a pressure transducer located within each Rn-220 target). After filling an Rn-220 target to a predetermined pressure or with ha predetermined amount of carrier gas based on the mass flow of the carrier gas feed, control system 210 may direct the multiway valve to begin filling a second Rn-220 target, followed by a third Rn-220 target and so on. Any number of Rn-220 targets may be used based on the production needs of the apparatus.

As a non-limiting illustrative example, an Rn-220 target 205 having a volume of 200 mL may be filled at a rate of 20 mL/minute, taking 10 minutes to fill. Once the first Rn-220 vessel (e.g., 205a) is filled, the apparatus begins to fill the second Rn-220 vessel (e.g., 205b) at a rate of 20 mL per minutes, also taking 10 minutes to fill. During this time, 10 half-lives of Rn-220 pass in the first Rn-220 target 205. When one or both Rn-220 targets 205 are emptied (for example, as needed based on the determination of control system 210) the system will stop with $N_2$ carrier gas filling of the Rn-220 targets 205 until the emptied vessels are filled with acid and then the process continues. Depending on the size of the emanation source 300 and flowrate of $N_2$ carrier gas; three, four or more Rn-220 target vessels 205 may be incorporated into the apparatus of FIG. 1 for sequentially alternating filling. The Rn-220 targets may, in some embodiments have different volumes from each other. It will be apparent to one of skill in the art having the benefit of this disclosure that any volumes, times, temperatures, and flow rates described herein are illustrative and non-limiting. For example, larger or smaller vessels could be utilized with longer or shorter filling times and higher or lower flow rates depending on the need for Pb-212 production.

In another embodiment, as described above, the Rn-220 targets 205 may contain an un-cooled acid or aqueous solution. In such an un-cooled system, the Rn-220 dissolves directly into the solution and so 10 half-lives time must pass to provide adequate time for the Rn-220 isotope to completely decay before changing the flow to the next Rn-220 target 205 in line.

In another embodiment, more than two Rn-220 targets 205 may be included in system 200. For example, three, four, five, or more Rn-220 targets may be included in the system. In such a system feed of Rn-220 containing $N_2$ carrier gas may periodically cycle between Rn-220 targets while Pb-212 is extract from other Rn-220 targets that are not being fed.

In embodiments in which the solution within the Rn-220 targets 205 is cooled below the freezing point of Rn-220, for example when the solution is cooled to −82° C., helping Rn-220 remain in liquid phase while decaying to Pb-212. At this temperature Rn-220 is held in the liquid phase within the chilled acid and will leave the Rn-220 target 205 through evaporation or gaseous diffusion with or without oscillated filling by Rn-220 containing $N_2$ carrier gas of the Rn-220 targets 205. During oscillated filling, while one target is filled with $N_2$ carrier gas carrying Rn-220, the other vessel is holding the Rn-220 and $N_2$ gas until the temperature of the contents of the vessel (i.e., the liquid and the gas contained within the Rn-220 target 205) is as low or lower than Rn-220's freezing point. At this temperature, Rn-220 is in liquid form (e.g. with chilled acid the Rn-220 forms a miscible liquid with the acid when chilled at or below the freezing point of Rn-220 but above the freezing point of the acid) and when the exit valve is opened only $N_2$ gas will leave the Rn-220 target 205. This oscillated filling process may continue for as long as needed to reach a desired amount of Pb-212.

Regardless of whether the solution in the Rn-220 targets 205 is cooled or not. When the Rn-220 decays, it to decays into Po-216, which has a half-life of only 0.145 seconds before decaying into Pb-212. The decay of Po-216 to Pb-212 is extremely energetic, resulting in Pb-212 ions having significant velocities. This is known to those of ordinary skill in the art as the recoil effect. These velocities are high enough that in previous methods utilizing solid Rn-220 targets, such as ion-exchange resins and urea, result in some of the Pb-212 atoms being embedded in the surface of the solid Rn-220 target material, thereby decreasing the yield of Pb-212. In the liquid-filled Rn-220 target vessels described herein, the Po-216 to Pb-212 decay takes place in the liquid media. The liquid solution mediates the speed of the Pb-212 atoms, allowing for a higher Pb-212 yield than was previously possible.

In the embodiments described above with Rn-220 targets 205 containing a solid Rn-220 target surface, such as a zeolite, metal zeolite-type chalcogenide, or tin-rich germanium material, the Rn-220 targets 205 may contain a spray nozzle to spray an acid or buffer solution, such as the HCl solution described above, onto the walls of the Rn-220 target 205. The spray nozzle located at the top of the Rn-220 target 205 may be configured to spray a small amount of liquid solution, such as an HCl solution, onto the sides of the Rn-220 target 205, the spray forming a thin film of liquid solution on the sides of the Rn-220 target 205. Such a spray nozzle may include any atomizing or fine misting nozzle appropriate for such an application as would be apparent to one of skill in the art having the benefit of this disclosure, and may be supplied by a pumped liquid solution fed from, for example, control system 210. The thin liquid film provides enough liquid to any Pb-212 atoms produced and thereby mitigate the recoil effect and loss of Pb-212 to the surface of the Rn-220 target 205.

In some embodiments, the Rn-220 target 205 may include a sparger or bubbler device and cone shape target material. The sparger or bubbler device may be operable to create many small $N_2$ carrier gas bubbles when the Rn-220 target is fed with $N_2$ carrier gas and filled with an acid, thereby increasing surface area of the $N_2$ carrier gas in the Rn-220 target and enhancing transfer of the Rn-220 from the $N_2$ carrier gas to the solvent (acid) within the Rn-220 target. The Rn-220 target 205 may include an entry port for $N_2$ carrier gas carrying Rn-220, and an exit port for release of $N_2$ free of Rn-220. The tubing and valve placement may be operated via software that provides sequences in which the oscillation between Rn-220 targets 205 takes place to trap Rn-220 and provide for adequate time for the Rn-220 to fully decay to Pb-212 in the media described above (e.g. in aqueous solution or sprayed solution via nozzle). In certain embodiments the software may be implemented using the information handling system of control system 210.

FIG. 5 is a perspective exploded view of an apparatus for producing and separating Pb-212, according to certain illustrative embodiments. In some embodiments, the apparatus of FIG. 5 may function in substantially the same manner as that of apparatus described herein with respect to the block diagram of FIG. 1 and the illustrative embodiment of FIG. 2. The apparatus of FIG. 5 includes a control unit 501 that may include or be communicatively coupled to an information handling system (not shown) and is operable to control flow rates, temperatures, valve cycles, and other aspects of the apparatus of FIG. 5. Dispensing system 502 may be coupled to control system 501 and may be operated to dispense aqueous solutions, into the various units of the apparatus of FIG. 5. For example, dispensing system 502 may be operable to dispense an aqueous solution, such as an HCL solution, into RN-220 targets 520 and 521. The dispensing system may also, independently or upon receiving instruction from the control system 501, dispense an aliquot of Pb-212 in solution from an Rn-220 target 520 or 521. In some embodiments, dispensing system 502 may be contained within the same housing as control system 501. As would be understood by those having skill in the art with the benefit of this disclosure, control system 1 may be coupled to any one or more sensors, control valves, coolers, heaters described herein and may be operable to process information obtain from such sensors and provide controlling output signals to control valves, heaters, coolers, alarms, and the like.

$N_2$ carrier gas feed 503 may include a mass flow meter and mass flow inlet valve 504 to control the flow of $N_2$ carrier gas to emanation source 506. Emanation source 506 may also be coupled to Th-228 feed 526, which may be coupled to or otherwise controlled by control system 501 to deliver Th-228 dissolved in an aqueous solution to emanation source 506. Emanation source 506 may contain high surface area materials as described in conjunction with FIGS. 3, 4, and 6, to provide residence for Th-228 within the emanation source 506. Emanation source 506 may also include a heat source 507, as described herein, to provide heat to evaporate any solvent which was used to carry the Th-228 into emanation source 506. Such evaporated solvent may exit emanation source 506 and flow through evaporation exit valve port 511, through Peltier cooler 517, which operates to condense the evaporated solvent, and into condensing bottle 525.

As described above Th-228 contained in emanation source 506 undergoes radioactive decay within emanation source 506, constantly decaying to Rn-220. To provide shielding from the radiation given off by the radioactive decay of Th-228, emanation source 506 is contained within lead shield 528, which may have sufficient thickness to block radiation produced by the radioactive decay of Th-228 and radioactive decay of isotopes that result from the decay of Th-228. Additionally, the lead shield 528 is positioned within a stainless steel shield cover 527, which may provide additional radiation shielding as well as providing an outer covering for emanation source 506 that is corrosion resistant.

As the Rn-220 is produced from the decay of Th-228, it is carried by the flow of $N_2$ carrier gas out of emanation source 506 through $N_2$ carrier gas exit valve 514, ultra-high purity gas filter 515, and inlet valve 516 to Rn-220 targets 520 and 521. Gas filter 515 may remove impurities such as small particulates, or Th-228 particles that have become unaffixed from the high surface area material of emanation source 506, from the flow of Rn-220 containing $N_2$ carrier gas. Inlet valve 516 may couple to control system 501 and may be operable to direct the flow of $N_2$ carrier gas to either Rn-220 target 520 or Rn-220 target 521. As described herein, in some embodiments, inlet valve 516 may be operable to periodically cycle flow of the $N_2$ carrier gas between Rn-220 target 520 and Rn-220 target 521.

Liquid feed 518 is fluidically coupled to Rn-220 target 520 and Rn-220 target 521 through multi-way valve 519. Liquid feed 518 may be coupled to and/or controlled by control system 501 and be operable to supply a feed of liquid, such as the aqueous HCL solutions described herein, to Rn-220 target 520 and/or Rn-220 target 521. Multi-way valve 519 may be operable to periodically cycle flow of the liquid feed between Rn-220 target 520 and Rn-220 target 521. Rn-220 targets 520 and 521 are positioned within cooling bath 522. Cooling bath 522 may be any temperature control unit/system, cooler or heat exchanger known in the art and may be operable to cool Rn-220 targets 520 and 521, and their contents, to temperatures sufficient to freeze Rn-220 that is carried into Rn-220 targets 520 and 521. For example, in a particular embodiment, cooling bath 522 may be operable to cool the contents of Rn-220 target 520 and Rn-220 target 521 to $-82°$ C. The temperature of cooling bath may depend and correlate to the freezing point of the type of acid and its molarity. Cooling bath 522 is positioned within lead shield for cooling bath 529. Lead shield for cooling bath 529 may be of sufficient thickness, to block radiation resulting from the decay of Rn-220 to Pb-212 withing Rn-220 targets 520 and 521. As described above, after Rn-220 that has collected in Rn-220 target 520 or Rn-220 target 521 has decayed into Pb-212, the aqueous solution containing the Pb-212 may be removed from Rn-220 target 520 or Rn-220 target 521, through multi-way valve 519, and into Pb-212 collection vessel 523. Rn-220 target 520 or Rn-220 target 521 are also coupled to rinse bottle 524. Rinse bottle 524 may collect any liquid that is feed through Rn-220 target 520 or Rn-220 target 521 to rinse the target vessels prior to introduction of Rn-220 during operation of the apparatus illustrated by FIG. 5.

The apparatus of FIG. 5 also includes PTFE Airtight Box 530. PTFE Airtight Box 530 may be constructed of PTFE or any other impermeable, non-reactive polymer or material. PTFE Airtight Box 530 is constructed so as to be airtight and contains emanation source 506. In some embodiments, PTFE Airtight Box 530 may have an air inlet and outlet, with the outlet being connected to an exhaust system. In the even that emanation source 506 develops a leak, PTFE Airtight Box 530 may contain the leak and provide for any leaking Rn-220/carrier gas to be routed through an exhaust system. Such an exhaust system may include a charcoal, or other high surface area material, filter operable to adsorb any Rn-220 in the event that emanation source 506 develops a leak. The exhaust system could also couple to an air compressed system (ACS), which collects radioactive gas, compresses it and will release it based on the half-life of the activity.

Finally, the apparatus of FIG. 5 has safety ball valves, 505, 508, 509, 510, 512, and 513 on the various feed an exit lines of the illustrated apparatus. Such safety ball valves are operable to shut off flow in the lines to enable isolation of the constituent components of the apparatus of FIG. 5. Isolation of these components may be used for maintenance such as cleaning or the replacement of parts. In some embodiments the safety ball valves 505, 508, 509, 510, 512, and 513 may be operable to receive signals to open or close from control system 501 and may be operable to return to a safe position if communication from control system 501 is lost (e.g., "fail-safe" operation).

Figure 6:
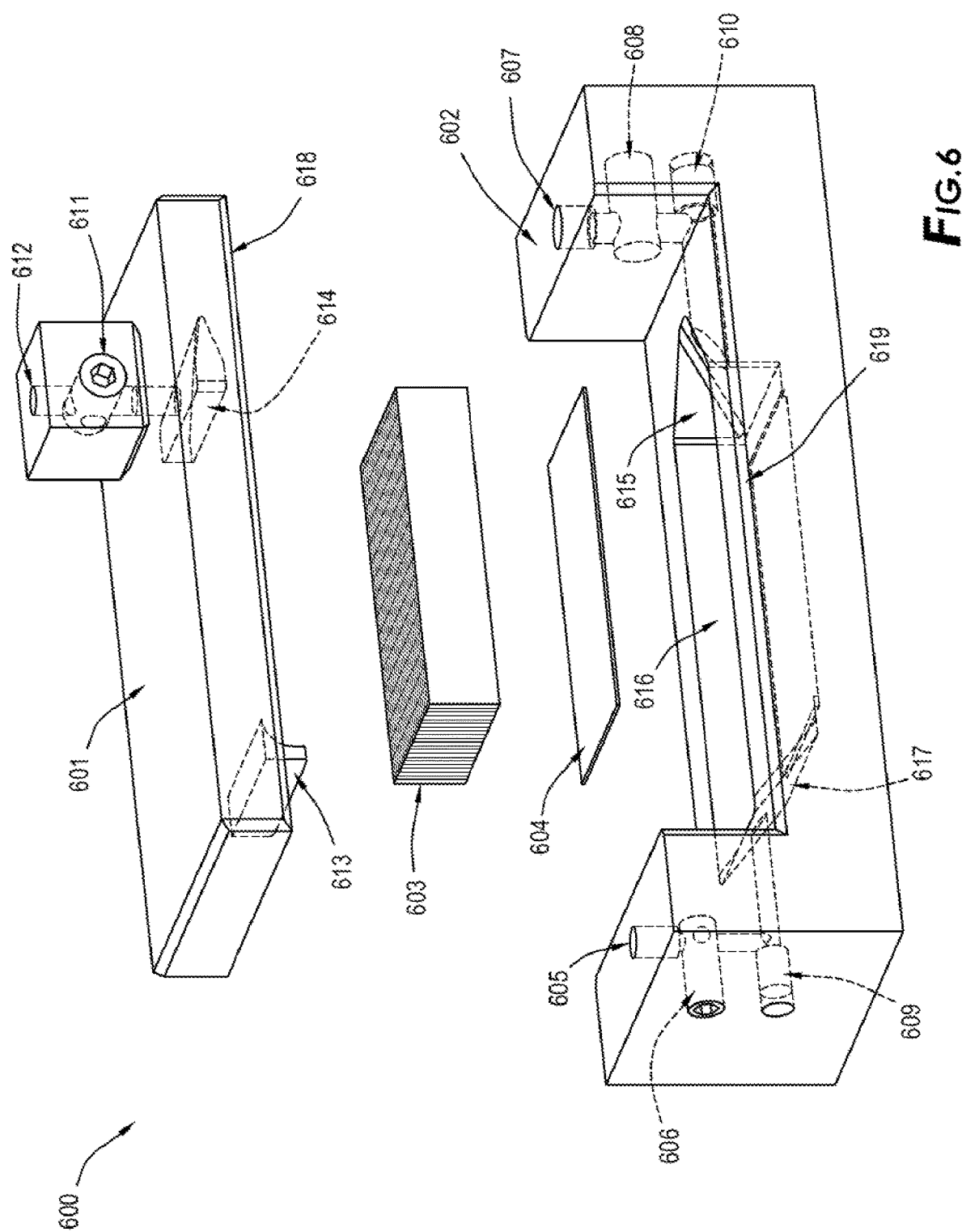
FIG. 6 is a close-up perspective view of an emanation source within the emanation box in accordance with an illustrative embodiment of the present disclosure.

FIG. 6 provides close up illustration of emanation source 506 of FIG. 5 as described herein, according to some embodiments. The emanation source 600 of FIG. 6 has an upper plate 601 and lower plate 602, which contain flow distribution fins 603 and flow distribution plate 604 and have entrance and exit ports for $N_2$ carrier gas, Th-228 feed, and solvent evaporate. Upper plate 601 and lower plate 602 may be joined together in a manner sufficient to form a seal between the two plates adequate to prevent the $N_2$ carrier gas or any evaporated solvent from exiting between the plates. For example, upper plate 601 and lower plate 602 may be welded together at chamfers for welding connection 618 and 619. Other methods of joining upper plate 601 and lower plate 602 would be apparent to those having skill in the art given the benefit of this disclosure.

Flow distribution fins 603 and flow distribution plate 604 may be made of any high surface area (i.e., porous) material described herein. Flow distribution fins 603 may contain multiple fins closely spaced together to provide a flow path for $N_2$ carrier gas to pass over the high surface area material fins of flow distribution fins 603. As described herein, these fins made of high surface area material absorb Th-228 that is introduced to the emanation source and provide a residence for the Th-228 until it decays into Rn-220, at which point it is carried out of the emanation source by the $N_2$ carrier gas.

Lower plate 602 has a carrier gas inlet port 605 operable to provide an inlet for a carrier gas, inlet shut off safety and transportation plug 606, outlet port 607 operable to provide an exit for carrier gas from the emanation source, outlet shut off safety and transportation plug 608, service plugs 609 and 610, focusing outlet cavity 615, main cavity 616, and inlet carrier gas distribution cavity 617. Upper plate 601 has carrier gas blade 613, vent cavity 614, vent port 612 operable to provide an exit for evaporated solvent, and vent shut off safety and transportation plug 611. Main cavity 616 provides a housing for flow distribution plate 604 and flow distributing fins 603. Upper plate 601 and lower plate 602 may be constructed of any non-reactive metal such as titanium, zirconium, gold, platinum, iridium, tungsten, and non-reactive alloys such as Monel or Inconel.

During operation, Th-228 in solution may be introduced into the emanation source of FIG. 6. For example, through $N_2$ carrier gas inlet port 605. As discussed above, introduction of Th-228 to the emanation source only occurs periodically, for example as little as once a year. After introduction of the Th-228 solution, heat may be applied to the emanation source 506, for example by the heat source 507 of FIG. 5 to evaporate any solvent. Evaporated solvent may flow out of the emanation source through vent cavity 614 and vent port 612.

Next, a flow of $N_2$ carrier gas is introduced to the emanation source 506 through $N_2$ carrier gas inlet port 605. In some embodiments, the flow of $N_2$ carrier gas may be introduced to the emanation source while the flow distribution fins are still "wet", e.g., before all of the solvent carrying the Th-228 has been evaporated. In other embodiments the flow of $N_2$ carrier gas may be introduced to the emanation source 6 after the flow distribution fins are "dry", e.g., after all, or substantially all, of the solvent carrying the Th-228 has been evaporated. The $N_2$ carrier gas flow is directed across the fins of flow distribution fins 603 by inlet carrier gas distribution cavity 617, flow distribution plate 604, and carrier gas blade 613 and flow to focusing outlet cavity 615 before exiting the emanation source through outlet port 607. Carrier gas blade 613 may be operable to direct and distribute the flow of income $N_2$ carrier gas across the flow distribution fins 603 and flow distribution plate 604 to ensure even and homogenous distribution of gas flow through emanation source 506. As described above, the flow of $N_2$ carrier gas through flow distribution fins 603 carries the Rn-220 formed from the radioactive decay of Th-228 absorbed onto the material of flow distribution fins 603 out of the emanation source.

The safety plugs 606, 608, and 611 of the emanation source 600 of FIG. 6 may be operable to isolate the interior of the emanation source from the outside environment. Because Th-228 has a half-life of 1.91 years, the interior of the emanation source 600 may remain radioactive for a significant period of time (e.g. 10 half-lives of Th-228) after Th-228 has been introduced to the emanation source 600. Therefore, it is important to be able to isolate the interior of the emanation source, for example if the emanation source needs to be moved or maintenance needs to be performed on the apparatus, to ensure that radioactive material does not escape from the emanation source.

Figure 8:
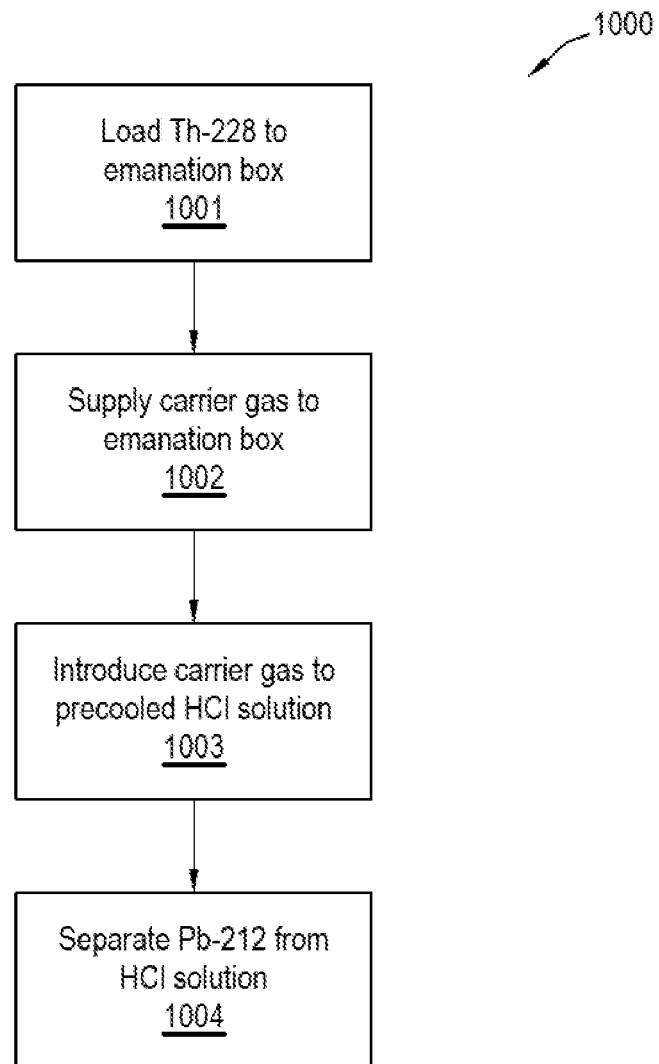
FIG. 8 provides a flow diagram of a method for producing Pb-212 in accordance with certain illustrative embodiments of the present disclosure.

As described above, in some embodiments, the apparatus of FIGS. 1, 2 and 5 may be operated by an automated control system. In certain illustrative embodiments the automated control system may be implemented using an information handling system. Such a system may automatically control a number of different system variables such as, for example, flow rates, timing, and temperatures based on one or more sensors placed throughout the apparatus of FIG. 1. For example, the automation system may operate the apparatus disclosed herein to produce Pb-212 by performing the method 1000 of FIG. 8. First, at step 1001, Th-228 is introduced into the emanation box 202 containing an emanation source 300 comprising a high-surface area material as described above with respect to FIGS. 1-6. Next at step 1002, a carrier gas comprising nitrogen is supplied to emanation box 202. As described above, the automation system may control the flow rate of the carrier gas based on measured mass flow. Next at step 1003, after flowing through the emanation box 202, the carrier gas is introduced to a precooled hydrochloric acid solution or any other acid or aqueous solution. And finally at step 1004, Pb-212 is separated from the hydrochloric acid solution. As described above, the precooled hydrochloric acid solution may have a temperature at or below −72° C. and may contain a target operable to collect Rn-220.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

What is claimed is:

1. A method for producing Pb-212 isotope comprising:
   introducing Th-228 into an emanation box,
   wherein the emanation box comprises an emanation source comprising a high-surface area material;
   introducing a carrier gas into the emanation box through a carrier gas feed,
   wherein the carrier gas is an inert gas,
   wherein the carrier gas flows through the emanation box,
   wherein the Th-228 decays to Rn-220 within the emanation box, wherein the carrier gas carries the Rn-220 resulting from decay of the Th-228 in the emanation box to one or more Rn-220 targets through a multi-way valve coupled to a carrier gas exit port of the emanation box;

separating the Rn-220 from the carrier gas in the one or more Rn-220 targets;

directing the carrier gas out of the one or more Rn-220 targets through a carrier gas exhaust port;

directing a liquid through a liquid feed into the one or more Rn-220 targets;

allowing the Rn-220 to undergo radioactive decay into Pb-212 isotope within the one or more Rn-220 targets;

wherein the liquid dissolves the Pb-212 isotope produced by radioactive decay of Rn-220 within the one or more Rn-220 targets;

directing the liquid containing the Pb-212 isotope from the one or more Rn-220 targets to a Pb-212 collection container; and separating the Pb-212 isotope from the liquid.

2. The method of claim 1, wherein the carrier gas is nitrogen.

3. The method of claim 1, wherein the liquid is an acid solution selected from the group consisting of HCL and $HNO_3$.

4. The method of claim 1, wherein the liquid is cooled to a temperature at or below −72° C. by a cooling unit coupled to the one or more Rn-220 targets.

5. The method of claim 1, wherein a flow rate of the carrier gas through the emanation box is controlled based on mass flow rate.

6. The method claim 1, further comprising:

directing the carrier gas to a first Rn-220 target through the multi-way valve coupled to the carrier gas exit port of the emanation box for a first time period;

opening a first carrier gas exhaust port on the first Rn-220 target after the first time period has elapsed; and directing the carrier gas to a second Rn-220 target through the multi-way valve coupled to the carrier gas exit port of the emanation box for a second time period after the first time period has elapsed.

7. The method of claim 1, wherein separating the Rn-220 from the carrier gas in the one or more Rn-220 targets comprises:

placing the carrier gas in contact with the liquid within the one or more Rn-220 targets until the Rn-220 has been transferred from the carrier gas to the liquid.

8. The method of claim 1, wherein the high-surface area material comprises a porous metal or porous ceramic material having a surface area between approximately 1 $m^2$ and 100,000 $m^2$.

9. The method of claim 8, wherein the porous metal comprises titanium, zirconium, gold, platinum, iridium tungsten or combinations thereof.

10. A method for producing Pb-212 isotope comprising:

introducing Ra-224 into an emanation box, wherein the emanation box comprises an emanation source comprising a high-surface area material;

introducing a carrier gas into the emanation box through a carrier gas feed, wherein the carrier gas is an inert gas, wherein the carrier gas flows through the emanation box, wherein the Ra-224 decays to Th-228 within the emanation box wherein the Th-228 decays to Rn-220 within the emanation box, wherein the carrier gas carries the Rn-220 resulting from decay of the Th-228 in the emanation box to one or more Rn-220 targets through a multi-way valve coupled to a carrier gas exit port of the emanation box;

separating the Rn-220 from the carrier gas in the one or more Rn-220 targets;

directing the carrier gas out of the one or more Rn-220 targets through a carrier gas exhaust port;

directing a liquid through a liquid feed into the one or more Rn-220 targets;

allowing the Rn-220 to undergo radioactive decay into Pb-212 isotope within the one or more Rn-220 targets;

wherein the liquid dissolves the Pb-212 isotope produced by radioactive decay of Rn-220 within the one or more Rn-220 targets;

directing the liquid containing the Pb-212 isotope from the one or more Rn-220 targets to a Pb-212 collection container; and separating the Pb-212 isotope from the liquid.

11. The method of claim 10, wherein the carrier gas is nitrogen.

12. The method of claim 10, wherein the liquid is an acid solution selected from the group consisting of HCL and $HNO_3$.

13. The method of claim 10, wherein the liquid is cooled to a temperature at or below −72° C. by a cooling unit coupled to the one or more Rn-220 targets.

14. The method of claim 10, wherein a flow rate of the carrier gas through the emanation box is controlled based on mass flow rate.

15. The method of claim 10, further comprising:

directing the carrier gas to a first Rn-220 target through the multi-way valve coupled to the carrier gas exit port of the emanation box for a first time period;

opening a first carrier gas exhaust port on the first Rn-220 target after the first time period has elapsed; and directing the carrier gas to a second Rn-220 target through the multi-way valve coupled to the carrier gas exit port of the emanation box for a second time period after the first time period has elapsed.

16. The method of claim 10, wherein separating the Rn-220 from the carrier gas in the one or more Rn-220 targets comprises:

placing the carrier gas in contact with the liquid within the one or more Rn-220 targets until the Rn-220 has been transferred from the carrier gas to the liquid.

17. The method of claim 10, wherein the high-surface area material comprises a porous metal or porous ceramic material having a surface area between approximately 1 $m^2$ and 100,000 $m^2$.

18. The method of claim 17, wherein the porous metal comprises titanium, zirconium, gold, platinum, iridium tungsten or combinations thereof.

19. The method of claim 1, wherein the one or more Rn-220 targets comprise a zeolite or metal chalcogenide with a zeolite-like structure.

20. The method of claim 10, wherein the one or more Rn-220 targets comprise a zeolite or metal chalcogenide with a zeolite-like structure.

* * * * *

UNITED STATES PATENT AND TRADEMARK OFFICE
CERTIFICATE OF CORRECTION

PATENT NO. : 11,383,204 B1
APPLICATION NO. : 17/506379
DATED : July 12, 2022
INVENTOR(S) : Ali A Abbasi It is certified that error appears in the above-identified patent and that said Letters Patent is hereby corrected as shown below:

In the Claims

Column 19, Line 62 through Column 20, Line 1 delete "Th-228 within the emanation box wherein the Th-228 decays to" so that Column 19, Line 62 through Column 20, Line 2 reads --wherein the Ra-224 decays to Rn-220 within the emanation box--

Column 20, Line 4 delete "Th-228" and replace with --Ra-224--

Signed and Sealed this
Twenty-second Day of October, 2024

Katherine Kelly Vidal
*Director of the United States Patent and Trademark Office*